(12) United States Patent
Truong et al.

(10) Patent No.: US 9,234,536 B2
(45) Date of Patent: Jan. 12, 2016

(54) RECEPTACLE FOR FASTENERS AND AN ASSOCIATED INSTALLATION METHOD

(71) Applicant: The Boeing Company, Chicago, IL (US)

(72) Inventors: Hoi Truong, Bothel, WA (US); Harold G. Erickson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/296,956

(22) Filed: Jun. 5, 2014

(65) Prior Publication Data

US 2014/0284335 A1    Sep. 25, 2014

Related U.S. Application Data

(62) Division of application No. 11/561,027, filed on Nov. 17, 2006, now abandoned.

(51) Int. Cl.
*F16B 5/01* (2006.01)
*F16B 11/00* (2006.01)

(52) U.S. Cl.
CPC ............. *F16B 5/01* (2013.01); *F16B 11/006* (2013.01); *Y10T 29/49826* (2015.01)

(58) Field of Classification Search
CPC .......... F16B 5/01; F16B 5/025; F16B 37/122; F16B 37/044; F16B 11/006; E04C 2/365; Y10T 29/49826; A47G 1/17
USPC ........ 52/783.1, 783.12, 784.1, 787.1, 787.12, 52/790.1, 793.1, 793.11, 799.11, 800.1, 52/742.1, 745.05; 411/82, 82.1, 373, 376; 220/324; 29/428; 248/205.3, 220.21, 248/188.1, 346.01
See application file for complete search history.

(56) References Cited

U.S. PATENT DOCUMENTS

| 2,784,758 | A | * | 3/1957 | Rohe ............................. 411/171 |
| 3,019,865 | A | | 2/1962 | Rohe |
| 3,041,912 | A | * | 7/1962 | Kreider et al. ............. 52/787.12 |
| 3,313,078 | A | | 4/1967 | Rohe |
| 3,339,609 | A | | 9/1967 | Cushman |
| 3,504,723 | A | | 4/1970 | Cushman et al. |

(Continued)

FOREIGN PATENT DOCUMENTS

GB    876106    8/1961

OTHER PUBLICATIONS

International Search Report and Written Opinion for PCT/US2007/021764 completed on Feb. 5, 2008.

*Primary Examiner* — Joshua J Michener
*Assistant Examiner* — Theodore Adamos
(74) *Attorney, Agent, or Firm* — Alston & Bird LLP

(57) ABSTRACT

A receptacle for a fastener is provided that may be relatively light weight and compact, may reduce the number of parts required for mounting an object to a surface, and may allow for greater flexibility in positioning the fastener. Additionally, a corresponding method for installing a receptacle and mounting an object is provided. The receptacle has an outer housing and a floating insert, and the floating insert is positioned within an internal cavity of the outer housing. A fastener may be inserted into an internal cavity of the floating insert through apertures in the outer housing and the floating insert. The floating insert is configured such that it is movable within the outer housing. As a result, the location of the aperture of the floating insert is adjustable, providing greater tolerances during the installation process.

17 Claims, 3 Drawing Sheets

(56) References Cited

U.S. PATENT DOCUMENTS

| | | | |
|---|---|---|---|
| 3,510,916 A * | 5/1970 | Phelan | 52/787.12 |
| 3,526,072 A * | 9/1970 | Campbell | 52/787.1 |
| 3,640,327 A | 2/1972 | Burt | |
| 3,646,982 A | 3/1972 | Cushman | |
| 3,662,805 A * | 5/1972 | Sygnator | 411/103 |
| 3,771,272 A * | 11/1973 | Mihaly et al. | 52/787.1 |
| 3,892,099 A | 7/1975 | Worgan et al. | |
| 3,910,331 A * | 10/1975 | Randall | 411/181 |
| 4,752,171 A * | 6/1988 | Pliml, Jr. | 411/171 |
| 4,846,612 A * | 7/1989 | Worthing | 411/82.1 |
| 4,847,959 A | 7/1989 | Shimada et al. | |
| 5,253,394 A | 10/1993 | Morita | |
| 5,378,099 A | 1/1995 | Gauron | |
| 5,632,582 A * | 5/1997 | Gauron | 411/82.1 |
| 5,947,509 A | 9/1999 | Ricks et al. | |
| 6,095,738 A * | 8/2000 | Selle | 411/427 |
| 7,195,436 B1 * | 3/2007 | Stephen | 411/82.1 |
| 2007/0297869 A1 | 12/2007 | Kunda | |

* cited by examiner

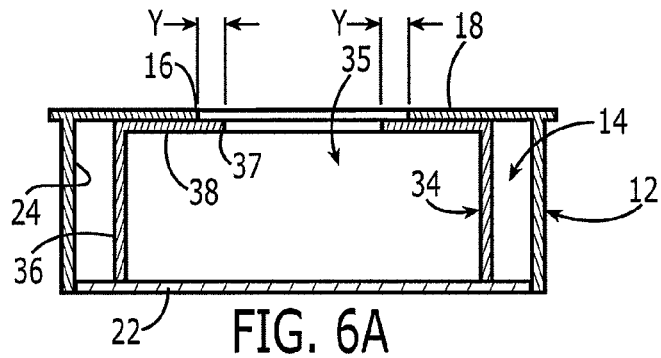
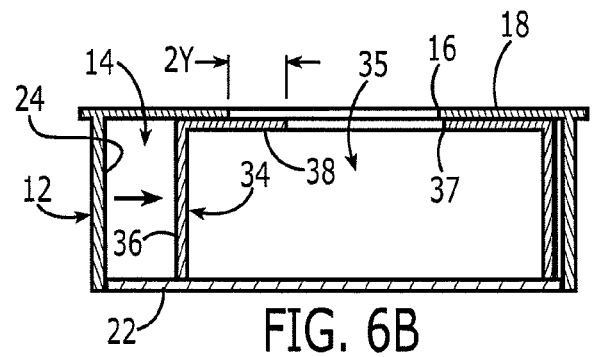
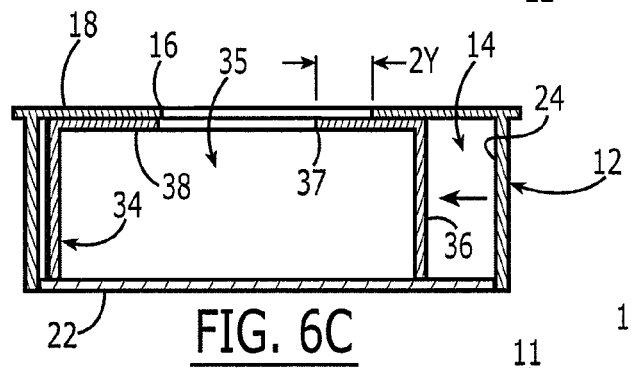
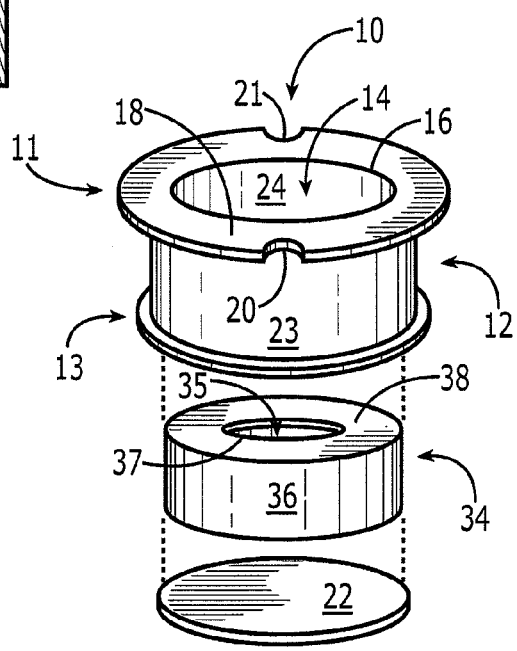

RECEPTACLE FOR FASTENERS AND AN ASSOCIATED INSTALLATION METHOD

CROSS-REFERENCE TO RELATED APPLICATIONS

This application is a divisional of U.S. application Ser. No. 11/561,027, filed on Nov. 17, 2006, the contents of which are incorporated herein by reference in their entirety.

FIELD OF THE INVENTION

Embodiments of the present invention are related to a receptacle for mounting objects on a surface and a method for installing the receptacle and mounting objects. In particular, embodiments of the present invention are directed to a receptacle for mounting objects on an aircraft interior surface using fasteners and an associated method.

BACKGROUND OF THE INVENTION

In aircraft and other structures, it is often desirable to mount objects, such as magazine display racks or control panels, to various surfaces. One common method of mounting objects is by using Nylatch® or other expandable fasteners. Nylatch® fasteners are designed to attach a removable member, such as a magazine display rack, to a fixed member, such as the interior wall or other interior surface of an aircraft, by expanding latching members of a fastener, such as a grommet end of a Nylatch® fastener, to lock the two members together.

Another common method of mounting objects is by using pegs or other fasteners having a head portion and a shank portion, the head being wider than the shank. With these types of fasteners, the shank portion of the fastener is attached or integral to the object to be mounted, such as the magazine rack. The object is mounted by hooking the head of the fastener into an appropriately shaped aperture in the fixed member, such as the interior surface of the aircraft.

In at least some instances, the construction of a wall or other surface to which an object is to be mounted makes it difficult or impossible to mount a fastener directly to the wall or other surface, at least with the surety that is desired. For example, some interior surfaces of aircraft consist of honeycomb panels. As a result, mounting an object to the honeycomb panel with a Nylatch® or other expandable fastener currently requires the use of a sheet metal plate which defines a hole to receive the grommet end of the fastener. The metal plate is attached to the honeycomb panel using one or more potted inserts that, in turn, are mounted within the honeycomb panel. The object to be mounted is attached to the metal plate by inserting the fastener into the hole defined by the metal plate and expanding the grommet end.

Mounting an object with a fastener such as a peg to a honeycomb panel similarly requires supplemental parts to prepare the mounting surface. A sheet metal plate with a keyhole-shaped aperture is required to receive the head portion of the fastener. The keyhole aperture consists of two intersecting apertures, one larger than the other. The larger portion of the keyhole is configured to receive the wider head portion of the fastener, and the smaller portion of the keyhole is configured to retain the head in the installed position and is thus smaller than the width of the head. The object is installed by inserting the head into the larger portion of the keyhole and sliding the peg into the smaller portion. However, this requires that the honeycomb panel be cut behind both portions of the keyhole before installing the metal plate to allow enough clearance for the head to slide from one portion of the keyhole to the other.

The current method of mounting objects to such interior surfaces has several disadvantages. It requires the manufacture of multiple parts, such as the metal plates and the potted inserts. The use of multiple parts increases the manufacturing and shipping costs, the cost of labor for installing the metal plates and mounting the objects, as well as the overall weight of the structure, which is a particularly acute concern for aircraft and other vehicles. Aesthetic concerns also factor in when the object to be mounted is smaller than the metal plate used for mounting, and the choice of location of the fasteners on the object to be mounted becomes limited. These disadvantages are further magnified by the large quantities of fasteners commonly utilized on board aircraft and other structures. In addition, the fixed nature of the holes in the metal plates provides small tolerances and does not allow for minor changes in the position of the fasteners, making small miscalculations in the mounting process costly.

Thus, there is a need for a simpler, more cost effective way of mounting objects using Nylatch® or other fasteners that requires fewer, lighter parts, allows greater flexibility in placement, and provides greater mounting tolerances.

SUMMARY OF THE INVENTION

Embodiments of the present invention are directed to a receptacle for a fastener that is relatively light weight and compact, reduces the number of parts required for mounting an object to a surface, and allows greater flexibility in the placement of the object to be mounted. Additionally, a corresponding method for installing a receptacle and mounting an object is provided. As a result, embodiments of the present invention address at least some of the concerns with the use of expandable fasteners.

A receptacle of one embodiment of the present invention has an outer housing forming an internal cavity and an aperture opening into the internal cavity. The internal cavity is configured to receive at least part of a fastener, such as the latching members of a Nylatch® fastener. The outer housing has a rim extending circumferentially out from the internal cavity. In some embodiments, the rim forms one or more openings to allow the application of adhesive when installing the receptacle in or on a surface. The rim of one embodiment serves as an integral spacer having increased thickness to allow for the installation of fasteners in certain types of surfaces where the depth of the mounting surface is less than the length of the shank or latching members of the fastener, such as with shallow panels.

In another embodiment, the outer housing has two rims. The first rim may extend circumferentially out from an end of the outer housing that defines the aperture, and the second rim may extend circumferentially out from an end of the outer housing opposite the first rim. In one embodiment, the second rim is larger than and extends beyond the first rim. The larger, second rim may define one or more openings to allow for the application of adhesive during installation of the receptacle directly onto a surface. The second rim may also have a plurality of pins extending away from the aperture. These pins may be used to locate the proper positioning of the receptacle with respect to holes configured to receive the pins in the mounting surface.

In another embodiment of the present invention, the aperture of the receptacle is configured to receive and hold in place the head portion of a fastener. In this case, the aperture has a keyhole shape formed by two intersecting aperture portions in the outer housing. The first aperture portion is sized to receive the head portion of a fastener. The second aperture portion is smaller than the first aperture portion and is sized to allow the fastener, e.g., a shaft of the fastener, to be moved from the first aperture portion to the second aperture portion. As a result, the head portion of a fastener may be inserted into the first aperture portion and moved into the second aperture portion of the keyhole aperture. Positioned in the second aperture portion, the head portion of the fastener is held in place by the outer housing. To facilitate the orientation of receptacles with respect to the mounting surface and the object to be mounted, the outer housing may be marked or notched, such as by forming a flat portion in a generally circular outer housing to mark the top of the receptacle for installation purposes.

A receptacle of another embodiment of the present invention has an outer housing and a floating insert. The outer housing defines an internal cavity and forms an aperture that opens into the internal cavity. The floating insert also defines an internal cavity and forms an aperture that opens into the internal cavity of the floating insert. The floating insert is sized to be smaller than the internal cavity of the outer housing and is configured to fit within the outer housing, such that the floating insert is movable within the internal cavity of the outer housing.

The aperture of the floating insert is configured to receive at least part of a fastener, such as the latching member of a Nylatch® fastener. In one embodiment, the aperture of the floating insert is smaller than the aperture of the outer housing. However, the floating insert of one embodiment is configured such that the aperture of the floating insert is within the aperture of the outer housing in all positions. The mobility of the floating insert within the outer housing provides the ability to make minor adjustments in the position of the fastener, thereby increasing mounting tolerances.

In some embodiments of the present invention, the receptacle may include a cap which mates with the outer housing to at least partially close the internal cavity of the outer housing. The cap may be configured to be press fit around the outer wall of the outer housing, it may be configured to fit inside the internal cavity of the outer housing, or it may be bonded to a surface of the outer housing, among other options.

Another embodiment of the present invention is directed to a method of mounting an object using a receptacle. As described above, the receptacle may include an outer housing and a floating insert fitting within an internal cavity of the outer housing such that the floating insert is movable within the outer housing. The receptacle is configured to receive a fastener and may be installed on a surface, such as the interior surface of an aircraft, for mounting an object. In one embodiment, the receptacle may be installed by forming a hole in the surface, inserting the receptacle into the hole, and bonding the receptacle within the hole. In another embodiment, the receptacle may be installed by forming a hole in the surface, inserting the receptacle at least partially into the hole, bonding the receptacle within the hole, and bonding the rim to the surface, such that the receptacle in the installed position is not flush with the surface but rather extends in part beyond the surface. In yet another embodiment, the receptacle may be bonded directly to the surface.

The fastener with the object to be mounted may then be at least partially inserted into the internal cavity of the outer housing or, if the receptacle includes a floating insert, into the internal cavity of the floating insert within the outer housing. In the case of a receptacle having a floating insert, if the fastener is not aligned exactly with the internal cavity of the floating insert, the floating insert may be moved within the outer housing to allow a better fit between the fastener and the receptacle.

BRIEF DESCRIPTION OF THE DRAWINGS

Figure 1:
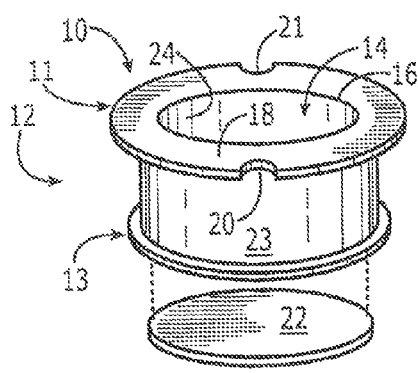
Figure 2:
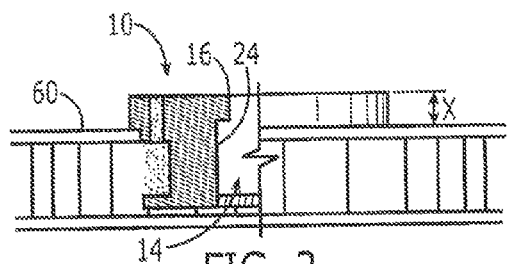
Figure 3:
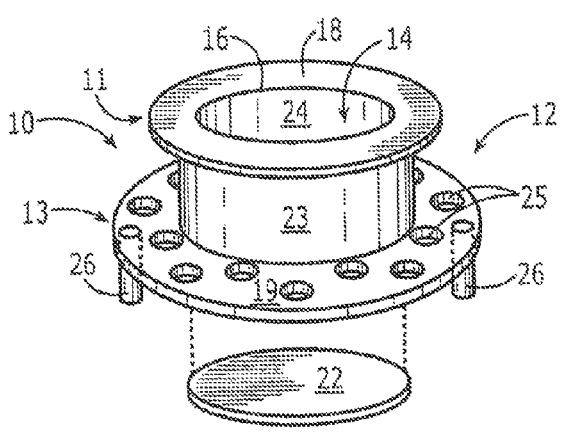
Figure 4:
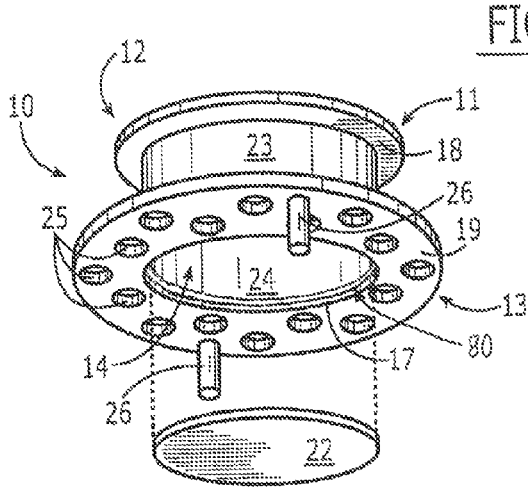
Figure 5:
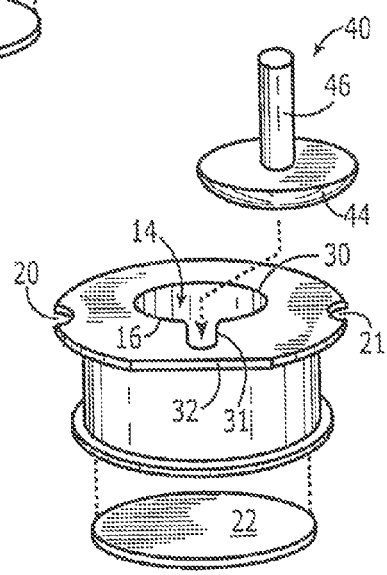
Figure 8:
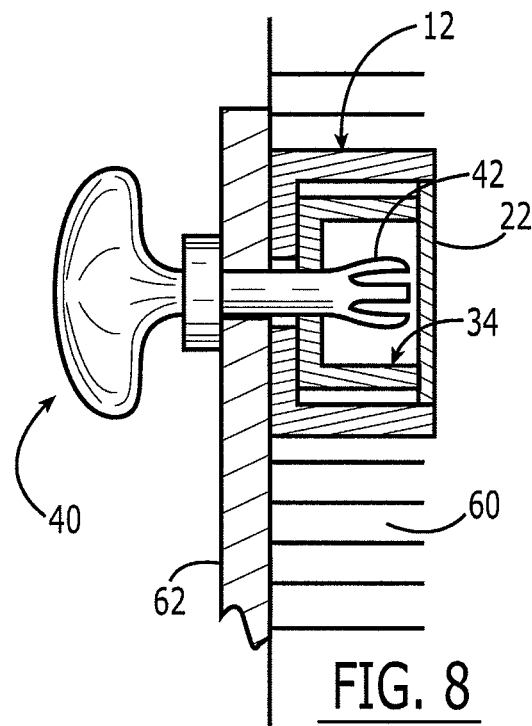
Figure 9A:
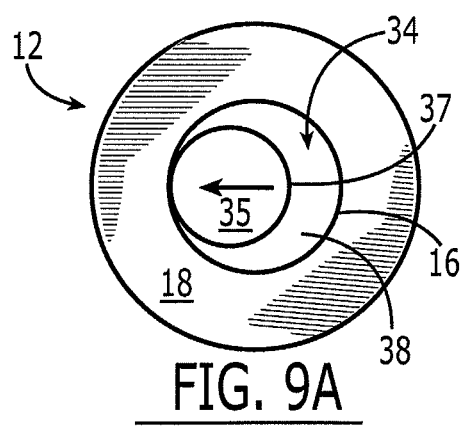
Figure 9B:
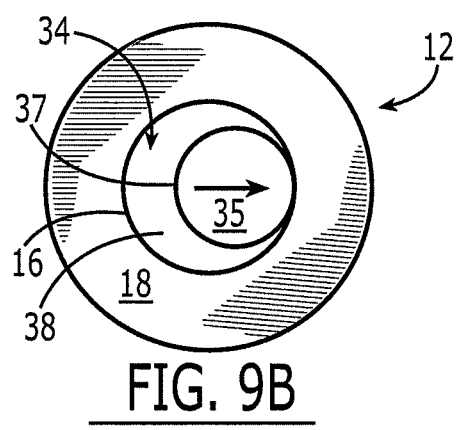

Having thus described the invention in general terms, reference will now be made to the accompanying drawings, which are not necessarily drawn to scale, and wherein:

FIG. 1 is an exploded view of a receptacle with a cap in accordance with one embodiment of the present invention;

FIG. 2 is a side view with partial cross-section of a receptacle in accordance with one embodiment of the present invention that is installed in a shallow panel;

FIG. 3 is a top perspective view of a receptacle in accordance with one embodiment of the present invention with first and second rims and openings for bonding the receptacle to a surface;

FIG. 4 is a bottom perspective view of a receptacle in accordance with one embodiment of the present invention with first and second rims and pins for orienting the receptacle;

FIG. 5 is a top perspective view of a receptacle with a keyhole aperture and notch in accordance with another embodiment of the present invention, as well as a fastener with a head portion and a shank portion;

FIG. 6A is a cross-sectional view of an assembled receptacle having an outer housing and a floating insert with a cap in accordance with one embodiment of the present invention, with the floating insert centrally located within the outer housing;

FIG. 6B is a cross-sectional view of an assembled receptacle having an outer housing and a floating insert with a cap in accordance with one embodiment of the present invention, with the floating insert moved to one side of the outer housing;

FIG. 6C is a cross-sectional view of an assembled receptacle having an outer housing and a floating insert with a cap in accordance with one embodiment of the present invention, with the floating insert moved to another side of the outer housing;

FIG. 7 is an exploded view of a receptacle having a floating insert with a cap in accordance with one embodiment of the present invention;

FIG. 8 is a cross-sectional view of a receptacle in accordance with one embodiment of the present invention that has a floating insert installed in a surface with a fastener and a mounted object;

FIG. 9A is a top plan view of a receptacle having a floating insert in accordance with one embodiment of the present invention, with the floating insert moved to one side of the outer housing; and FIG. 9B is a top plan view of a receptacle having a floating insert in accordance with one embodiment of the present invention, with the floating insert moved to another side of the outer housing.

DETAILED DESCRIPTION OF THE INVENTION

Embodiments of the present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The receptacle 10 of one embodiment of the present invention is shown in FIG. 1. The receptacle 10 comprises an outer housing 12 defining an internal cavity 14 and an aperture 16 that opens through a first end 11 of the outer housing 12 into the internal cavity 14. Although the receptacle 10 and correspondingly the internal cavity 14 can have various shapes, the receptacle 10 and the internal cavity 14 of one embodiment are generally cylindrical as shown in the figures. The internal cavity 14 of the outer housing 12 is configured, e.g., sized and shaped, to partially receive a fastener 40, such as a plurality of latching members 42 of a fastener 40, shown in FIG. 8. Referring again to FIG. 1, the outer housing 12 has a first rim 18 extending circumferentially about the internal cavity 14 and disposed at the first end 11 of the outer housing 12 so as to define the aperture 16. The first rim 18 generally extends inwardly from a sidewall 23 of the outer housing 12 at or proximate the first end 11 so as to define the aperture 16. In some embodiments, the first rim 18 may also extend outwardly from the sidewall 23 of the outer housing 12. In these embodiments, the first rim 18 may define one or more openings 20, 21 which facilitate the application of adhesive during the installation of the receptacle 10 in a surface 60, as described hereinbelow.

Referring to FIGS. 4 and 7, at least in those embodiments discussed below in which a floating insert 34 is to be disposed within the internal cavity 14, the receptacle 10 may be constructed such that the internal cavity 14 is accessible via an aperture 17 defined in a second end 13 that is larger than the aperture 16 defined by the first rim 18. The receptacle 10 of one embodiment defines an aperture 17 in the second end 13 of the outer housing 12, opposite the first end 11. The aperture 17 defined in the second end 13 of the outer housing 12 also opens into the internal cavity 14 and is larger than the aperture 16 defined by the first end 11 of the outer housing 12. In this regard, the aperture 17 defined in the second end 13 of the outer housing 12 may have the same or nearly the same cross-sectional dimensions, e.g., diameter, as the internal cavity 14. In this embodiment, the receptacle 10 may further comprise a cap 22 that snugly fits within the aperture 17 defined in the second end 13 of the outer housing 12 and mates with the outer housing 12. In some embodiments, the outer housing 12 includes a groove 80 in the inner wall 24 of the outer housing 12, e.g., shown in FIG. 4. The cap 22 may be press fit or bonded to the groove 80 of the outer housing 12, thereby partially closing the internal cavity 14 of the outer housing 12, such as following the insertion of the floating insert 34 as noted below.

In another embodiment of the present invention, shown in FIG. 2, the first rim 18 has a predefined thickness X such that the first rim 18 can serve as a spacer for mounting objects 62 on certain surfaces 60. For example, a surface 60 may be too shallow to fully receive the length of a fastener 40. In this case, the predefined thickness X of the first rim 18 supplements the thickness of the surface 60 and allows for the latching members 42 to be fully received within the internal cavity 14 of the receptacle 10 even though the latching members 42 are otherwise longer than the surface is thick.

The receptacle 10 of another embodiment of the present invention is shown in FIGS. 3 and 4. The outer housing 12 of this embodiment includes a first rim 18 and a second rim 19. The first rim 18 extends circumferentially about the internal cavity 14 and is disposed at the first end 11 of the outer housing 12 closest to the aperture 16 as described above. The second rim 19 extends circumferentially about the internal cavity 14 in a plane that is parallel to the plane in which the first rim 18 lies. The second rim 19 is spaced apart from the first rim 18, however, and is typically disposed at the second end 13 of the outer housing 12 opposite the aperture 16. The second rim 19 may extend outwardly from a sidewall 23 of the receptacle by a greater distance than the first rim 18. The second rim 19 may also define a plurality of openings 25 to facilitate in the bonding of the receptacle 10 to a surface 60 as described below.

Referring to FIG. 4, which shows a bottom view of the receptacle 10, the second rim 19 may have one or more pins 26 extending outwardly from the receptacle 10, such as in a direction orthogonal to the respective planes defined by the first and second rims 18, 19. The pins 26 may be used to orient the receptacle 10 with respect to the surface 60 by inserting the pins 26 into pre-formed holes in the surface 60.

Another embodiment of the receptacle 10 of the present invention is shown in FIG. 5. In this embodiment, the aperture 16 of the outer housing 12 has a keyhole shape. The keyhole aperture 16 may consist of a first portion 30 and a second portion 31 wherein the first and second portions 30, 31 intersect and the first portion 30 is larger than the second portion 31. A fastener 40 having a head portion 44 and a shank portion 46, also shown in FIG. 5, may be used to hold an object 62 to the surface 60 by inserting the head portion 44 into the first portion 30 of the aperture 16 and moving it into the second portion 46. The first portion 30 of the aperture 16 and the head portion 44 of the fastener 40 are configured such that the head portion 44 is smaller than the first portion 30 and, therefore, can be inserted through the first portion 30 and into the internal cavity 14. The second portion 31 of the aperture 16 is configured to be smaller than the head portion 44 such that the head portion 44 will be retained within the internal cavity 14 once the fastener 40 has been translated as described above. As will be apparent, the shank portion 46 is smaller or at least no larger in cross-section than the second portion 31 of the aperture 16 such that the shank portion 46 can freely move between the first and second portions 30, 31. Once the fastener is moved into alignment with the second portion 31 of the aperture 16, the head portion 44 of the fastener 40 is held in place by the outer housing 12, and mounting of the object 62 affixed to the fastener 40 is thus accomplished. As illustrated in FIG. 5, the receptacle 10 may include a notch 32 in the first rim 18 of the outer housing 12. This notch 32 facilitates installation of the receptacle 10 in a surface 60 by providing a reference orientation for the aperture 16 with respect to the object 62 to be mounted.

FIGS. 6-9 show a receptacle 10 of another embodiment of the present invention. The receptacle 10 of this embodiment comprises an outer housing 12 and a floating insert 34. Referring to FIGS. 7 and 8, the outer housing 12 defines an internal cavity 14 and an aperture 16 that opens into the internal cavity 14. A first rim 18 extends circumferentially about the internal cavity 14 of the outer housing 12 and is disposed at the first end 11 of the outer housing 12 closest to the aperture 16.

As indicated above, the floating insert 34 is configured to fit within the internal cavity 14 of the outer housing 12 and is therefore sized to be smaller than the internal cavity 14 of the outer housing 12. For example, in an embodiment including a cylindrical receptacle 10 and a cylindrical floating insert 34, the circumference (or diameter) of the outer wall 36 of the floating insert 34 is smaller than the circumference (or diameter) of the inner wall 24 of the outer housing 12. In this way, the floating insert 34 is movable within the outer housing 12, providing a maximum tolerance of 2Y for mounting objects 62. This characteristic is illustrated in FIGS. 6A, 6B, and 6C. The floating insert 34 is larger, however, than the aperture 16 defined by the outer housing 12 such that the floating insert 34 is retained within the internal cavity 14 of the receptacle 10 by its first rim 18.

Referring again to FIGS. 6 and 7, the floating insert 34 also defines an internal cavity 35 and an aperture 37 that opens into the internal cavity 35 of the floating insert 34. The aperture 37 is typically defined by a lip 38 proximate one end of the floating insert 34 that extends inwardly from the outer wall 36 of the floating insert 34 and circumferentially about the aperture 37. The internal cavity 35 of the floating insert 34 is configured to partially receive a fastener 40. For example, the internal cavity 35 may be configured, e.g., sized and shaped, to receive a plurality of latching members 42 of a fastener 40, shown in FIG. 8, through the aperture 16 of the outer housing 12 and the aperture 37 of the floating insert 34. In one embodiment, the aperture 37 of the floating insert 34 is smaller than the aperture 16 of the outer housing 12. In this embodiment, the outer housing 12 and the floating insert 34 are advantageously configured such that the aperture 37 of the floating insert 34 is, in all positions, fully within the aperture 16 of the outer housing 12, as illustrated in FIGS. 9A and 9B.

As noted above, in some embodiments of the present invention, the receptacle 10 includes a cap 22 that mates with the outer housing 12, as shown in FIG. 6. The cap 22 may be press fit or bonded to the inner wall 24 of the internal cavity 14 of the outer housing 12, thereby partially closing the internal cavity 14 of the outer housing 12. Similarly, the outer housing 12 may include a groove 80 in the inner wall 24 of the outer housing 12, e.g., as shown in FIG. 4 into which the cap 22 may be press fit or bonded. As such, prior to mating the cap 22 with the outer housing 12, the floating insert 34 may be inserted into the internal cavity 14. The cap 22 may then be mated with the outer housing 12 to at least partially close the internal cavities 14, 35 and to retain the floating insert 34 therewithin.

Methods of installing a receptacle 10 in accordance with another aspect of the claimed invention will now be described. In embodiments that utilize a receptacle 10 that includes a floating insert 34, the floating insert 34 is initially positioned within the internal cavity 14 and the cap 22 is attached to the outer housing 12, partially closing the internal cavity 14 of the outer housing 12, to retain the floating insert 34 within the internal cavity 14. See, for example, FIGS. 6 and 7.

An assembled receptacle 10 may be mounted to a surface 60 in several ways. Referring to FIG. 8, for example, a hole may be formed in a surface 60, such as a wall, partition or the like, to receive the receptacle 10. The receptacle 10 may then be inserted into the hole and secured within the hole, such as by bonding. In this regard, adhesive or another bonding agent may be injected within the hole about the exterior of the receptacle 10. In order to facilitate the injection of the adhesive, the first rim 18 may define a first opening 20 through which the adhesive is injected, shown in FIG. 7. The first rim 18 may also define a second opening 21, typically located about 180° from the first opening 20. As such, adhesive may be injected through the first opening 20 defined by the first rim 18 until adhesive begins to emerge from the second opening 21, at which time the injection of the adhesive may be terminated.

Although the receptacle 10 may be flush mounted in some situations, in other situations, such as when the surface 60 is a shallow panel, the receptacle 10 may be only be partially inserted into the hole, as shown in FIG. 2. In this case, a receptacle 10 with a first rim 18 having a predefined thickness X is used. The receptacle 10 is bonded partially within the hole, and the first rim 18 of the outer housing 12 is bonded to the surface 60 by application of adhesive to the surface of the first rim 18 that faces the surface 60. As such, the receptacle 10 of this embodiment is not installed flush with the surface 60. Similarly, a receptacle 10 may be attached directly to a surface 60, such as by bonding the second rim 19 of the receptacle 10 to the surface 60. To facilitate the application of adhesive about the second rim 19, the second rim 19 can also define one or more openings 25, shown in FIGS. 3 and 4, through which adhesive may engage the second rim 19.

An object 62 to be mounted onto a surface 60 may then be attached to the receptacle 10 using a fastener 40. In embodiments having a floating insert 34, the fastener 40 may be partially inserted into the internal cavity 35 of the floating insert 34 through the aperture 16 of the outer housing 12 and the aperture 37 of the floating insert 34. If necessary, the location of the aperture 37 of the floating insert 34 may be adjusted relative to the outer housing 12 to obtain better alignment with the location of the fastener 40 being used to mount the object 62 to the surface 60, as shown in FIG. 9. As such, the relative movement permitted between the floating insert 34 and the outer housing 12 serves to increase the permissible tolerance Y between the fastener 40 and the receptacle 10, as illustrated in FIG. 6.

For example, a fastener 40, such as a Nylatch® fastener, may have a plurality of latching members 42. The latching members 42 of the fastener 40 may first be inserted through an opening defined by the object 62 to be mounted to the surface 60. The latching members 42 of the fastener 40 are then inserted into the internal cavity 35 of the floating insert 34 through the apertures 16, 37 of the outer housing 12 and the floating insert 34, respectively. In a fastener 40 in which the latching members 42 are expandable, the latching members 42 may be compressed while being fit through the aligned apertures 16, 37 and then expanded within the internal cavity 35 of the floating insert 34 to secure the fastener 40 and the object 62 in place. An installed receptacle 10 having a floating insert 34 and a mounted object 62 are shown in FIG. 8.

In an embodiment wherein the receptacle 10 does not include a floating insert 34 and wherein the aperture 16 is in the shape of a keyhole, a fastener 40 such as the one shown in FIG. 5 may be used to mount an object 62. In this case, the head portion 44 of the fastener 40 is inserted into the first portion 30 of the aperture 16 and moved into the second portion 31. As a result of the relative sizes of the first and second portions 30, 31, the head portion 44 of the fastener 40 is retained within the internal cavity 14 as described above.

The receptacle 10 of embodiments of the present invention may be utilized to mount a variety of objects 62 to various surfaces 60. For example, the receptacle 10 may be employed onboard an aircraft or other vehicle in which an object 62, such as a magazine rack, is desirably mounted to an interior surface 60, such as a wall, a partition or the like.

It is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. A receptacle comprising:
   an outer housing comprising:
      a first end;
      a second end;
      a sidewall;
      a first rim that extends radially outwardly from the sidewall of the outer housing and a second rim that extends radially outwardly from the sidewall of the outer housing and is spaced from the first rim, wherein:
the first rim extends radially outwardly from the sidewall by a first distance,
the second rim extends radially outwardly from the sidewall by a second distance,
the second distance is greater than the first distance,
the second rim comprises openings extending therethrough and configured to receive adhesive for engaging the receptacle within a mounting surface,
the second rim has at least one pin extending therefrom in a direction away from the first rim, and
the at least one pin is configured to orient and space the second rim with respect to the mounting surface and engage the mounting surface;
an internal cavity extending from the first rim to the second rim and having an inner surface and a central axis;
a first aperture defined by the first rim, wherein the first aperture opens into the internal cavity from the first end of the outer housing and is configured to receive a fastener therethrough; and
a second aperture defined by the second rim, wherein the second aperture opens into the internal cavity from the second end of the outer housing and a groove is formed in the inner surface of the internal cavity proximate the second aperture; and
a cap configured to mate with the groove of the outer housing to at least partially close the internal cavity of the outer housing.

2. The receptacle of claim 1, wherein any two of the openings in the second rim adjacent to each other are arranged at different distances from the central axis of the internal cavity.

3. The receptacle of claim 1, wherein the cap is press fit into the groove of the outer housing.

4. The receptacle of claim 1, wherein the cap is bonded to the groove of the outer housing.

5. The receptacle of claim 1, wherein the second aperture is larger than the first aperture.

6. The receptacle of claim 1, wherein the second rim comprises two pins spaced apart from each other and disposed opposite each other with respect to the central axis of the internal cavity.

7. The receptacle of claim 1, wherein the first rim is configured to be disposed proximate an upper surface of the mounting surface and the second rim is configured to be embedded within the mounting surface.

8. The receptacle of claim 1, wherein:
the first rim defines a first plane,
the second rim defines a second plane, and
the first plane and the second plane are generally parallel to each other.

9. A method comprising:
providing a receptacle comprising:
an outer housing comprising:
a first end;
a second end;
a sidewall;
a first rim that extends radially outwardly from the sidewall of the outer housing and a second rim that extends radially outwardly from the sidewall of the outer housing and is spaced from the first rim, wherein:
the first rim extends radially outwardly from the sidewall by a first distance,
the second rim extends radially outwardly from the sidewall by a second distance,
the second distance is greater than the first distance,
the second rim has at least one pin extending therefrom in a direction away from the first rim, and
the at least one pin is configured to orient and space the second rim with respect to a mounting surface and engage the mounting surface;
an internal cavity extending from the first rim to the second rim and having an inner surface and a central axis;
a first aperture defined by the first rim, wherein the first aperture opens into the internal cavity from the first end of the outer housing; and
a second aperture defined by the second rim, wherein the second aperture opens into the internal cavity from the second end of the outer housing and a groove is formed in the inner surface of the internal cavity proximate the second aperture;
at least partially closing the internal cavity of the outer housing by mating a cap with the groove in the inner surface of the outer housing;
orienting and spacing the second rim of the outer housing with respect to the mounting surface using the at least one pin; and
mounting the receptacle to the mounting surface by applying adhesive to a plurality of openings defined in the second rim and extending therethrough.

10. The method of claim 9, wherein any two of the openings in the second rim adjacent to each other are arranged at different distances from the central axis of the internal cavity.

11. The method of claim 9, wherein at least partially closing the internal cavity of the outer housing comprises press fitting the cap into the groove of the outer housing.

12. The method of claim 9, wherein at least partially closing the internal cavity of the outer housing comprises bonding the cap to the groove of the outer housing.

13. The method of claim 9, wherein the second aperture is larger than the first aperture.

14. The method of claim 9, wherein the second rim comprises two pins spaced apart from each other and disposed opposite each other with respect to the central axis of the internal cavity.

15. The method of claim 9, wherein mounting the receptacle to the mounting surface comprises forming a hole in the mounting surface, inserting the receptacle into the hole, and bonding the receptacle within the hole.

16. The method of claim 9, wherein mounting the receptacle to the mounting surface comprises disposing the first rim proximate an upper surface of the mounting surface and embedding the second rim within the mounting surface.

17. The method of claim 9, attaching an object to the mounting surface by inserting latching members of a fastener through the first aperture defined by the first rim and into the internal cavity defined by the outer housing.

* * * * *